United States Patent [19]
Capper et al.

[11] Patent Number: 5,513,075
[45] Date of Patent: Apr. 30, 1996

[54] MODULE FOR ELECTRICALLY CONNECTING CONDUCTOR WIRES TO CIRCUITS OF FLAT SURFACES SUCH AS SOLAR PANELS

[75] Inventors: Harry M. Capper; Sam Denovich, both of Harrisburg; James W. Robertson, Oberlin, all of Pa.

[73] Assignee: The Whitaker Corporation, Wilmington, Del.

[21] Appl. No.: 204,975

[22] Filed: Mar. 2, 1994

Related U.S. Application Data

[63] Continuation-in-part of Ser. No. 880,449, May 8, 1992, Pat. No. 5,321,577, and Ser. No. 59,789, May 7, 1993, Pat. No. 5,317,474, which is a continuation-in-part of Ser. No. 880,449.

[51] Int. Cl.⁶ .................. H01R 9/24; H01R 4/24
[52] U.S. Cl. .................. 361/773; 361/774; 361/822; 361/823; 361/809; 439/404; 439/403; 439/713; 439/410; 439/409; 439/395
[58] Field of Search .................. 361/728, 729, 361/730, 733, 736, 740, 752, 807, 809, 822, 823; 174/52.1, 52.2, 52.3, 52.4, 60; 439/122, 131, 132, 142, 143, 144, 151, 158, 709, 711, 715, 716, 717, 718, 620, 389–410; 379/399, 442, 412, 415

[56] References Cited

U.S. PATENT DOCUMENTS

| | | | |
|---|---|---|---|
| 3,249,908 | 5/1966 | Fuller et al. | 339/98 |
| 4,060,296 | 11/1977 | Kunkle et al. | 339/17 CF |
| 4,152,686 | 5/1979 | Hughes | 336/192 |
| 4,623,753 | 11/1986 | Feldman et al. | 174/50 |
| 4,624,518 | 11/1986 | Seidel | 339/97 P |
| 4,742,541 | 5/1988 | Cwirzen et al. | 379/412 |
| 5,006,077 | 4/1991 | Loose et al. | 439/409 |
| 5,120,245 | 6/1992 | Robertson et al. | 439/395 |
| 5,145,388 | 9/1992 | Brownlie et al. | 439/142 |
| 5,154,639 | 10/1992 | Knoll et al. | 439/620 |
| 5,219,302 | 6/1993 | Robertson et al. | 439/404 |
| 5,318,461 | 6/1994 | Frikkee et al. | 439/715 |

FOREIGN PATENT DOCUMENTS

0529957A1  3/1993  European Pat. Off. .

OTHER PUBLICATIONS

AMP Catalog 82257 Issued Sep. 1991, "AMP Quiet Front Terminal Block", six pages; AMP Incorporated, Harrisburg, PA.
U.S. Applications Serial No. 07/955,535 filed Oct 1, 1992; Denovich, et al.; Abstract and Drawings only included.
U.S. Application Serial No. 08/166,180 filed Dec. 10, 1993; Robertson et al.; Abstract and Drawings only included.

*Primary Examiner*—Donald A. Sparks
*Attorney, Agent, or Firm*—Anton P. Ness

[57] ABSTRACT

A connector module (10,100,200) having at least one electrical terminal (24,116,206) therein, adapted to be sealingly mounted to a mounting surface upon being placed thereagainst at a connection site (30,112,204), and simultaneously form electrical connections of each terminal with a circuit (38,152,214) thereat, with the terminal adapted to be thereafter terminated to a discrete conductor wire (60,138, 210,212) to interconnect the circuit with the wire. Upstanding lead members (40,160,216) are electrically connected to the circuits and are received into pin-receiving holes (50, 172) along the module's bottom surface and become engaged with respective terminals. Each terminal is terminated to such a wire upon actuation of an actuator (26,118). A base section (14,104) of the module forms a seal with the mounting surface around the connection site (30,112,204). Such module can easily be mounted to a solar panel (32,110) or circuit board (202). The module can receive thereinto a circuit-bearing element (124) having components (122) mounted thereon upon being mounted to the mounting surface and environmentally seal therearound.

18 Claims, 11 Drawing Sheets

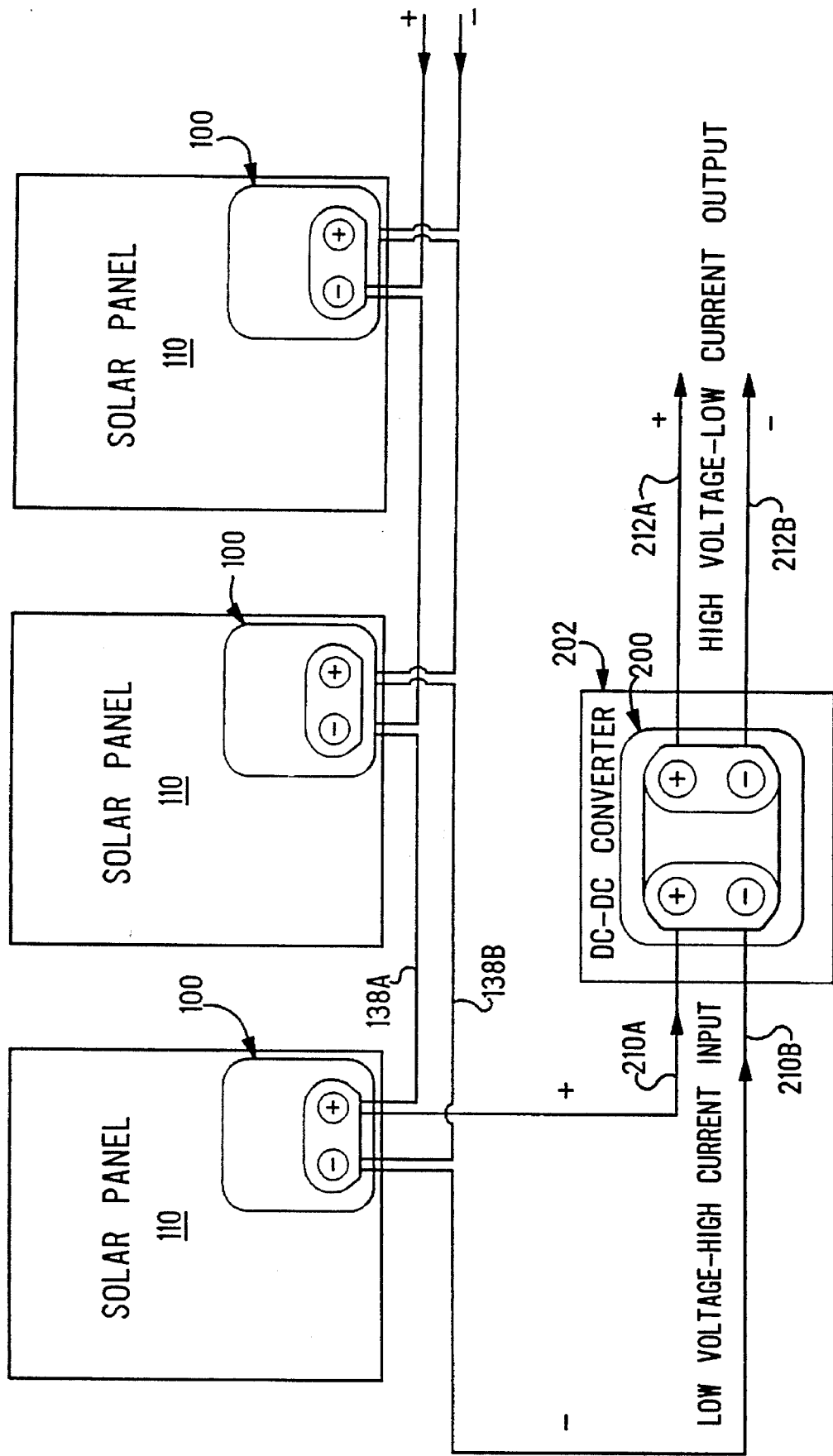

MODULE FOR ELECTRICALLY CONNECTING CONDUCTOR WIRES TO CIRCUITS OF FLAT SURFACES SUCH AS SOLAR PANELS

RELATED APPLICATION INFORMATION

This is a Continuation-in-Part of U.S. patent application Ser. No. 07/880,449 filed May 8, 1992, now U.S. Pat. No. 5,321,577 and a Continuation-in-Part of U.S. patent application Ser. No. 08/059,789 filed May 7, 1993, now U.S. Pat. No. 5,317,474, which is in turn a continuation-in-part of said Ser. No. 07/880,449, U.S. Pat. No. 5,321,577.

FIELD OF THE INVENTION

This relates to the field of electrical connectors and more particularly to connectors for interconnecting discrete conductor wires to circuits of flat surfaces such as of circuit boards, or of solar panels for transmission of electrical energy.

BACKGROUND OF THE INVENTION

With the advent of solar panels, it has become necessary to provide electrical connectors to enable electrical connection of solar panels to conductor wires for the transmission of electrical energy generated by the solar panel by conversion of sunlight to electricity through the use of photovoltaic cells.

In one type of solar panel, a thin film of metal oxide is vacuum deposited along an active surface of a glass substrate for direct receipt of sunlight thereonto and divided into discrete spaced apart film regions by laser ablation of gaps therebetween to define cells. A positive bus circuit is defined along one side edge of the opposed surface to which positive ends of the array of photovoltaic cells are connected, and a negative bus circuit is defined along the opposed side edge to which the negative ends of the cells are connected. The buses may comprise silver frit overlaid with insulative film except at termini thereof exposed to be electrically interconnected for transmission of electrical energy from the panel. One such connector module is associated with the positive bus and another with the negative bus. It is desirable to provide an electrical connector at the termini of the buses that establishes an environmental seal around the termini for protection against environmental effects such as moisture and humidity.

In another type of solar panel having an array of photovoltaic cells fabricated of polycrystalline material electrically interconnected either in series to sum their voltages or in parallel to sum their currents as desired, one or more blocking diodes are mounted on a base member such as a circuit-bearing element, with cathodes and anodes of the diodes electrically connected to respective circuits of the circuit card. The blocking diodes are utilized in banks of such solar panels to permit transmission of electrical energy in only one direction outwardly of each solar panel and preventing energy from being transmitted into a panel from a bus when it is temporarily blocked from receipt of sunlight. It is desirable to provide an electrical connector mountable on or adjacent a solar panel terminating two or more circuits thereof extending from electrical components such as blocking diodes, that enables and facilitates the connection to those circuits of respective insulated conductor wires for transmission of electrical energy from the panel.

It is desirable to provide such an electrical connector that is easily mountable to a connection site subsequent to the mounting of the electrical components to the solar panel, and that sealingly houses the components and the eventual connections thereof to conductor wires.

Electrical connectors are known in the telecommunications industry which enables the connection of conductor wires from a main distribution cable to individual subscriber cables such as at residences and offices, housed within a protective enclosure or junction box located inside or outside a structure. One example of an assembly of a splice terminal block and self-sealing enclosure therefor is disclosed in U.S. Pat. No. 5,219,302 and U.S. Pat. No. 5,145,388. Therein, a terminal block has a single-piece barrel-shaped terminal with connecting sections for both wires to be spliced, and the terminal is of the insulation piercing or displacement type which eliminates the need for stripping the insulation from the signal wire conductors. A dielectric housing includes an integrally molded center post within a tubular terminal-receiving housing section, both coextending from a common base section and defining an annular cavity, the housing section providing wire-receiving openings through side walls and into the cavity aligned with an aperture through the center post, enabling insertion of wire ends during splicing.

A barrel-shaped terminal and an associated lug-capped tubular actuator is then assembled to the housing, with the barrel terminal surrounding the center post within the cavity and having apertured insulation displacement contact sections which are initially aligned with the wire-receiving openings of the housing and center post, and the actuator also having profiled apertures therethrough extending partially around the circumference and also aligned with the wire-receiving openings of the housing, center post and terminal. The lug extends above the housing upon assembly to be accessible to tooling for rotation thereof to rotate the actuator and the terminal.

During splicing the wire ends of both wires are inserted into respective openings and through the apertured contact sections until abutting stop surfaces of the housing which then holds the wire ends at two spaced locations, both outside and within the terminal wall; the actuator is then rotated through an angular distance of about a quarter turn in turn rotating the terminal, and the constricted edges of a precisely profiled slot extending from each of the terminal's apertures penetrate the wire insulation of both wires simultaneously and engage the conductors therewithin, completing the splice.

The terminal blocks of U.S. Pat. No. 5,219,302 are modular in nature, comprising a pair defined in the same housing member for mounting within an enclosure adapted for a plurality of such modules. The two-terminal block housing is mountable in a selected orientation such that the wire-receiving openings of each of the terminal blocks are oriented facing a cable exit of the enclosure, or other common point from where the pairs of conductors originate as discrete wires from two cables.

In U.S. patent application Ser. No. 07/880,449 filed May 8, 1992 is disclosed a single module having two barrel-shaped terminals each with a pair of insulation displacement slots for termination by rotary actuation to respective conductors of two cables, for crossconnecting or splicing the tip and ring lines of a service line extending to a customer with a cable extending to the main distribution line. Each barrel terminal is in electrical engagement with a circuit element such as a wire length extending to a respective separate portion of the module for electrical connection to an active electrode of a respective protector unit within a respective housing section. The two protector units each include a ground electrode grounded to a common ground strap which includes a contact section exposed along the bottom of the module to be assuredly engaged with a ground strap along the floor of the enclosure upon mounting of the module therein, for grounding to a ground stud for external system grounding. The wire-receiving apertures of the two housing sections containing the terminals are preferably oriented to face a cable exit of the enclosure to facilitate receipt of the conductors for wire termination upon rotation actuation of the terminals by respective lug-capped actuators. An enclosure for protected terminal blocks or modules includes a ground strap extending from a ground stud to each terminal block mounting region, enabling the contact section of the module ground strap to engage its top surface upon mounting of the terminal block in position.

SUMMARY OF THE INVENTION

The present invention is a module having a terminal disposed within a housing section and having an insulation displacement slot for termination to an insulated end portion of a conductor wire inserted through a wire-receiving opening through the wall of the housing section. Upon complete assembly, the terminal is in electrical engagement with a lead or pin member extending to a connection with a respective circuit of an article such as a solar panel or a circuit board, with both the terminal and associated lead disposed within the housing section, while a base section of the module is adhered to a planar surface portion of the article defining an environmental seal around the length of the lead and electrical connections thereof to both the circuit and the terminal. The terminal is then moved by the actuator orthogonal to the wire for side edges of the slot to penetrate the insulation of the wire and electrically engage the conductor wire therewithin. Preferably the terminal is barrel-shaped within an annular cavity of a cylindrically-shaped housing section and is rotatable therewithin by manual or tool-assisted rotation of an actuator exposed at the top of each respective housing section, relatively moving the wire into the slot to establish the electrical connection of the terminal to its conductor.

The lead preferably is an upstanding stiff wire having a relatively flat, widened mounting section having a flat bottom surface disposed atop the terminus of the circuit and soldered thereto, with a wire section extended upwardly to a free end. The wire section is easily received into an opening of the module to extend thereinto along and against the barrel-shaped terminal in a compression fit against a surface thereof to establish an assured electrical connection therewith without solder.

In another embodiment of the present invention, a single module has two barrel-shaped terminals each with a pair of insulation displacement slots for termination by rotary actuation to respective conductors of one or two cables for each terminal, for connecting an end of the insulated wire to a circuit of an article such as a solar panel or a circuit board. Upon complete assembly, each barrel terminal is in electrical engagement with a respective lead extending to a respective circuit that extends to an appropriate one of a cathode or anode of an electrical component such as a blocking diode of a solar panel, or a resistor or surge protector of a circuit board, with both the barrel terminal and wire section of the associated lead disposed within a common housing section. Each barrel terminal is rotatable by manual or tool-assisted rotation of an actuator exposed at the top of each respective housing section.

In a solar panel blocking diodes may be mounted onto a circuit-bearing element that is then placed adjacent to the surface of the solar panel, with three contact members mounted on the circuit-bearing element and exposed to be connected to positive, negative and commoning circuits of the solar panel such as by conductive strips of flexible film soldered to termini of the silver frit buses or circuits of the panel surface at a connection site. The cathode of one diode is associated with the positive bus, the anode of the other diode is associated with the negative bus, and the remaining electrodes are associated with the commoning circuit, all appropriately connected thereto by respective circuits of the circuit-bearing element extend from the electrodes. Circuits of the circuit-bearing element also interconnect the positive and negative buses and appropriate electrodes of the blocking diodes to respective leads for connection to respective terminals of the module.

Leads have flat widened base sections mounted beneath the circuit-bearing element terminated to the circuits at termini thereof, and include upstanding wire sections extending upwardly through apertures of the circuit card and coextending from the card. The base sections may also be surface mounted atop the circuit termini, as desired. The connector module includes a transverse base section adapted to receive the electrical components into a cavity or cavities thereof and to surround and house the circuit-bearing element and the electrical connections of the components with the circuits, and the contacts and their electrical connections with the solar panel frit pads after the periphery of the base section is adhered to the surface of the solar panel, thus environmentally sealing all the electrical connections. Preferably potting material is injected into the module housing through a fill hole after mounting to embed the components and exposed metal within sealing material.

In both embodiments, the connector module includes for each lead a lead-receiving aperture through the mounting face and in communication with the annular cavities within which cylindrical terminals are secured. Preferably, each such aperture is aligned with a groove along the outer surface of a center post surrounded by the cylindrical terminal, all adapted for receipt of the upstanding wire section of the respective lead upon mounting of the connector module to the solar panel at the connection site. The housing sections preferably include therewithin sealant material to embed the terminals and connections thereof with the wire sections of the leads and the insulated wires later inserted thereinto.

In another application of the present invention, the connector module is mountable onto a portion of a circuit board to interconnect circuits thereof to discrete wires, in an environmentally sealed connection, and provides for the housing of electrical and electronic components mounted on the board, thus sealing the components within the module.

It is an objective to provide an electrical connector mountable to a flat surface and upon mounting establishes an electrical connection with a circuit thereof, and that enables simple and quick termination to ends of one or more insulated wires and simultaneously seals the terminations.

It is an additional objective to provide such a connector that permits simple and quick replacement of the insulated wires and again enables simple and quick termination to ends of replacement wires, and sealing thereof.

It is also an objective to provide an electrical connector module that defines merely upon mounting, an environmentally sealed cavity surrounding the connection site and any electrical components previously mounted to the flat surface at the connection site.

It is yet another objective to provide such a connector module having components which are easily assembled to the flat surface in a manner which establishes assured electrical connections with the electrical components merely upon mounting.

Embodiments of the present invention will now be described by way of example with reference to the accompanying drawings.

BRIEF DESCRIPTION OF THE DRAWINGS

FIG. 12 is a diagrammatic representation of an application of the embodiment of FIG. 11 for DC-to-DC conversion of electrical energy produced by an array of solar panels from a low voltage/high current input to a high voltage/low current output.

DETAILED DESCRIPTION OF THE PREFERRED EMBODIMENT

Figure 1:
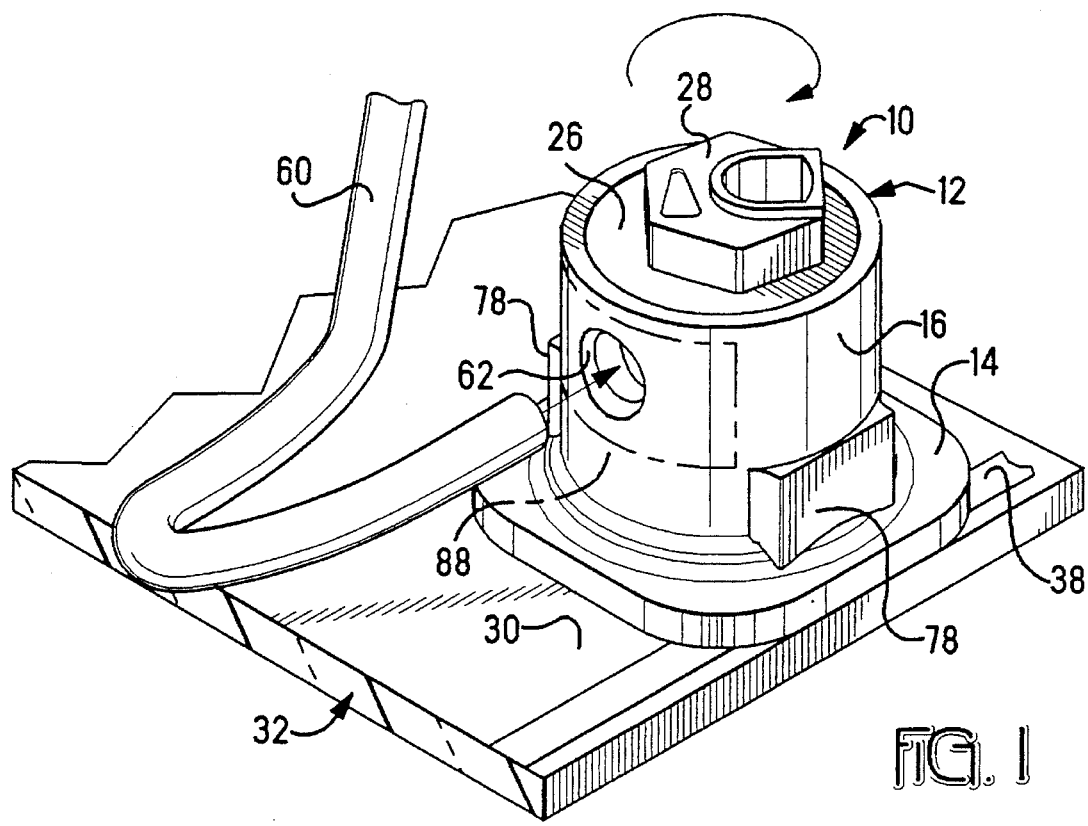
FIG. 1 is an isometric view of the electrical connector of the present invention showing the assembly mounted to a flat surface of an article having an electrical circuit, ready for receipt thereinto of an end of a conductor to be connected to the circuit.

FIGS. 1 to 6 illustrate a first embodiment of the present invention, wherein a connector module 10 includes a housing 12 having a base section 14 and a housing section 16 having an annular cavity 18 surrounding a center post 20 and extending to an upper surface 22. Annular cavity 18 is adapted to receive thereinto a barrel-shaped terminal 24 around center post 20 and also an actuator 26 cooperable with terminal 24 to rotate it about the center post about a quarter-turn when lug-shaped cap 28 is engaged and rotated by an appropriate tool such as a socket wrench.

Figure 2:
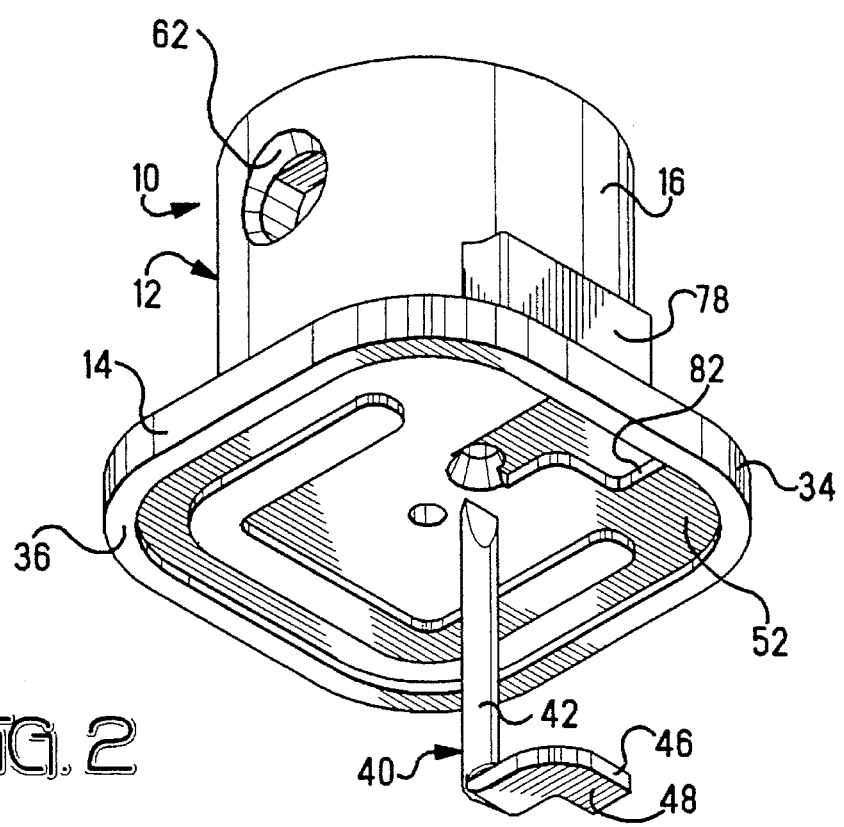
FIG. 2 is an isometric view of the connector of FIG. 1 and a lead of the article receivable into the bottom surface of the connector upon mounting.
Figure 3:
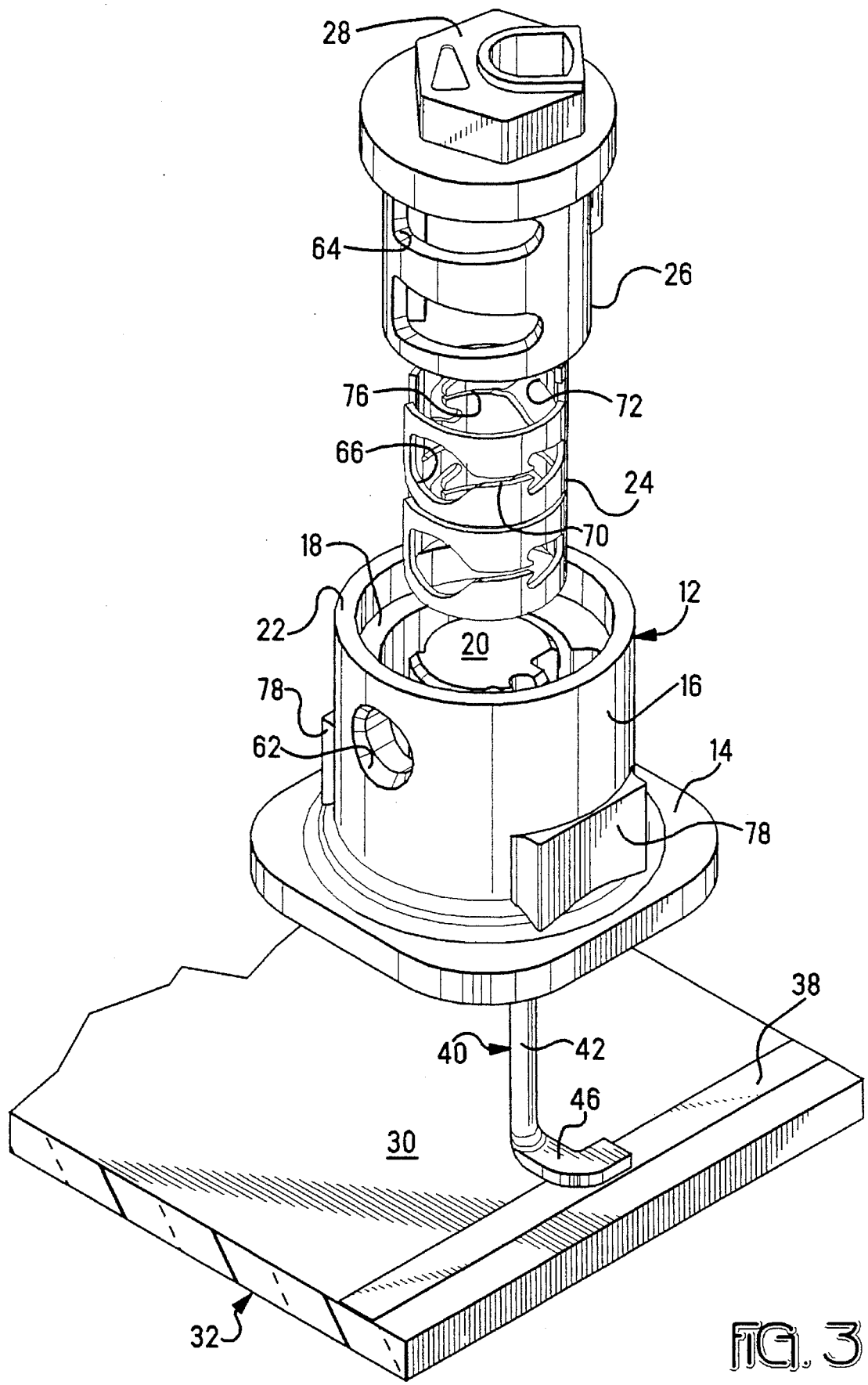
FIGS. 3 and 4 are exploded isometric and elevational views of the components of the electrical connector of FIGS. 1 and 2.
Figure 4:
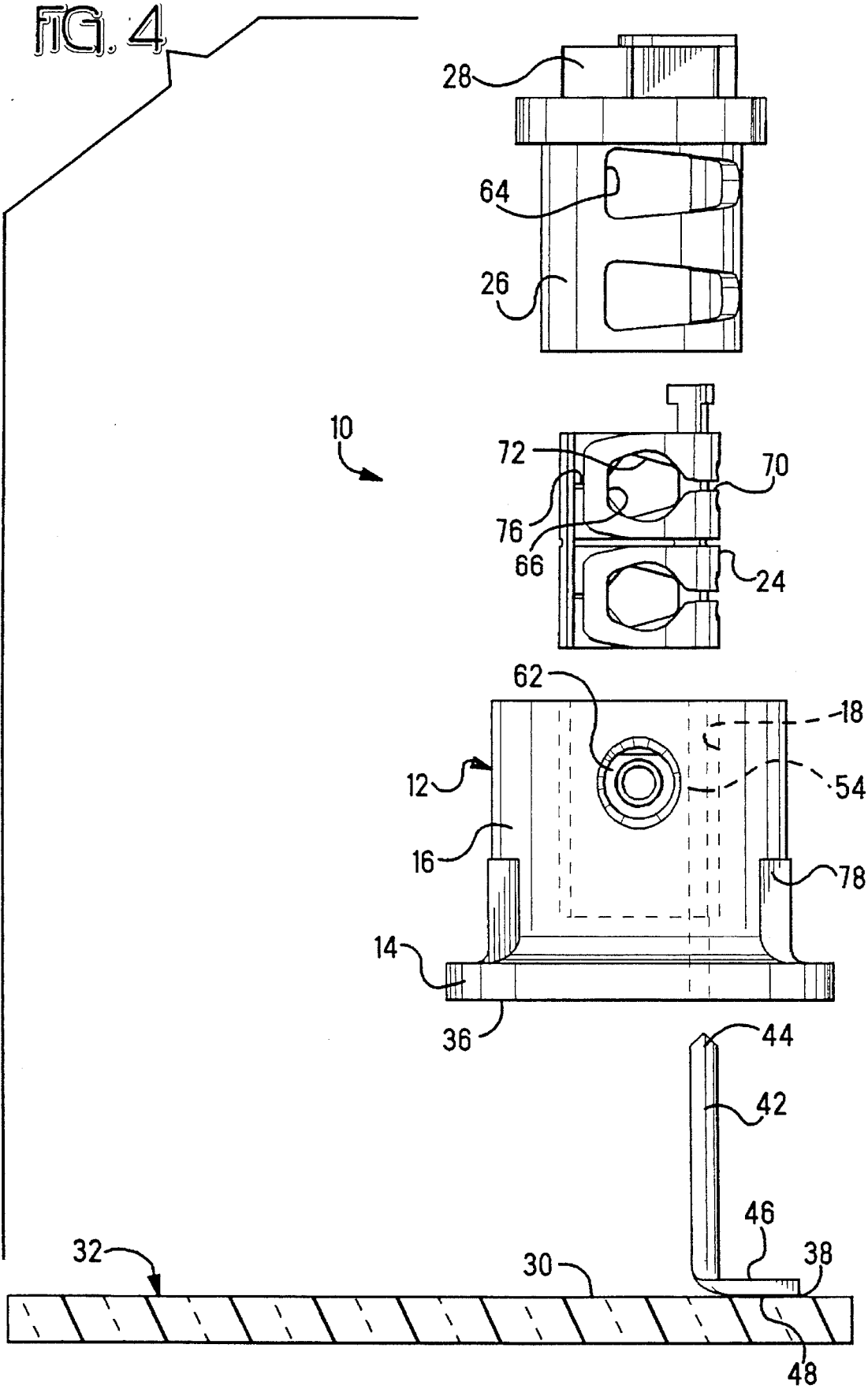

Connector module 10 is shown in FIG. 1 mounted to a connector site 30 of a solar panel 32. Base section 14 of housing 12 includes a continuous peripheral mounting flange 34 extending to a planar bottom edge 36 adapted to be bonded to the flat surface of solar panel 32. Connector site 30 includes a frit pad, or terminus, of circuit 38 exposed to be electrically interconnected while the remainder of circuit 38 is disposed beneath a layer of insulative film. Lead or pin 40 is seen in FIG. 2 to have a wire section 42 extending to a free end 44 from a base section 46 which is flattened and widened and is electrically connected to circuit 38 such as by flat bottom surface 48 thereof being soldered to the frit pad of the circuit.

Upstanding wire section 42 extends into a respective aperture 50 orthogonally through mounting face or bottom surface 52 of housing base section 14 and within and along a groove 54 vertically along center post 20. Free end 44 of wire section 42 is preferably tapered to facilitate insertion into aperture 50 which also preferably has a tapered entrance facilitating insertion, and which is aligned with groove 54. Upon full insertion along groove 54, tapered free end 44 facilitates initial bearing engagement with the bottom edge of terminal 24 upon insertion of terminal 24 thereover and into annular cavity 18 without stubbing. The depth of each groove 54 is selected considering the diameter of wire section 42 so that wire section 42 protrudes laterally partially out of its groove 54 to engage the inside surface of terminal 24 in intimate contact therewith when terminal 24 is inserted into annular cavity 18 upon full assembly. Upon full terminal insertion, terminal 24 is held compressed against wire section 42 of lead 40 and is still rotatable in annular cavity 18 upon rotation of actuator 26.

Figure 5:
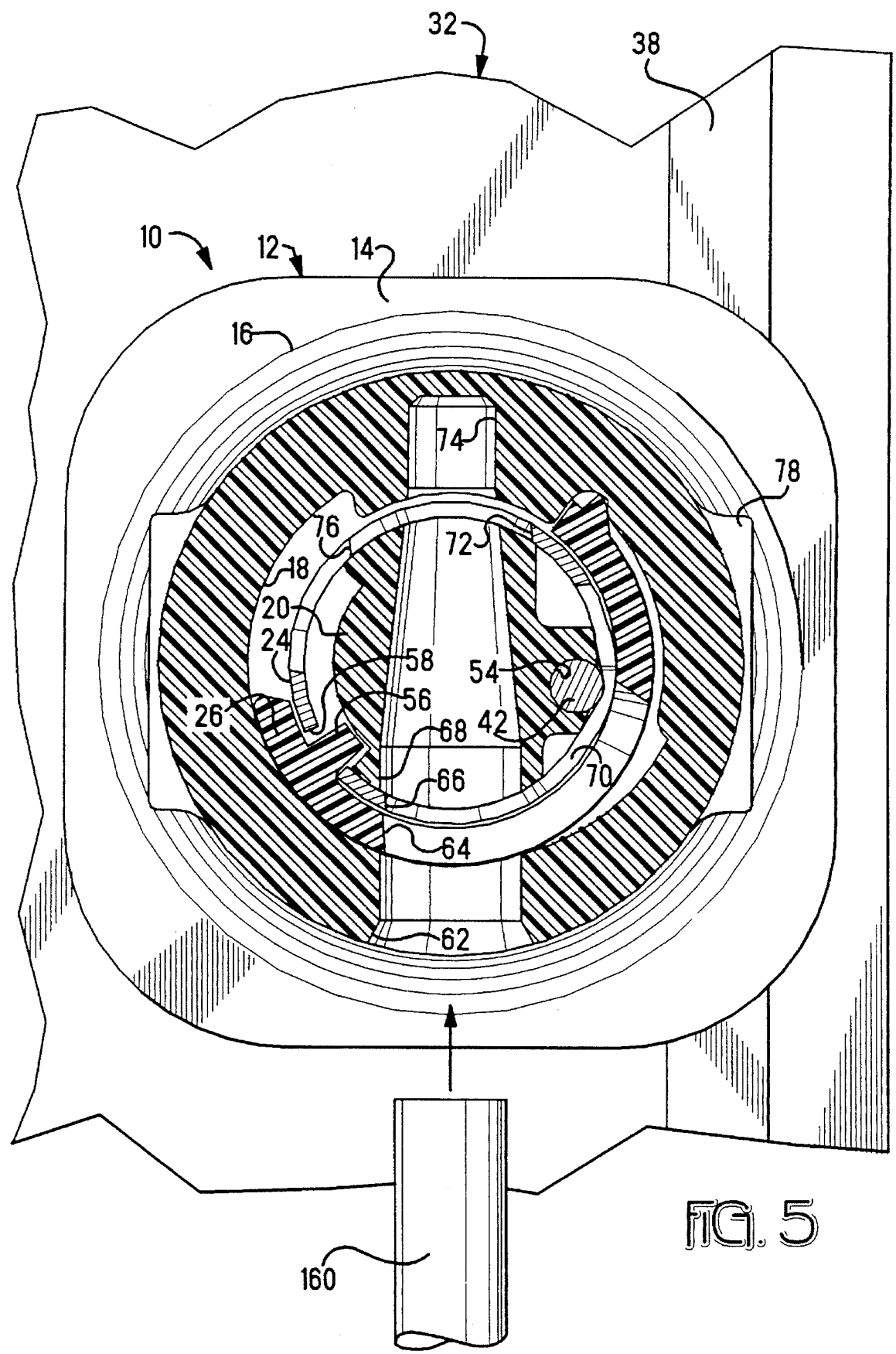
FIGS. 5 and 6 are cross-sectional views of the connector of FIGS. 1 to 4 illustrating the connector and the connections of the lead thereof to the terminal.
Figure 6:
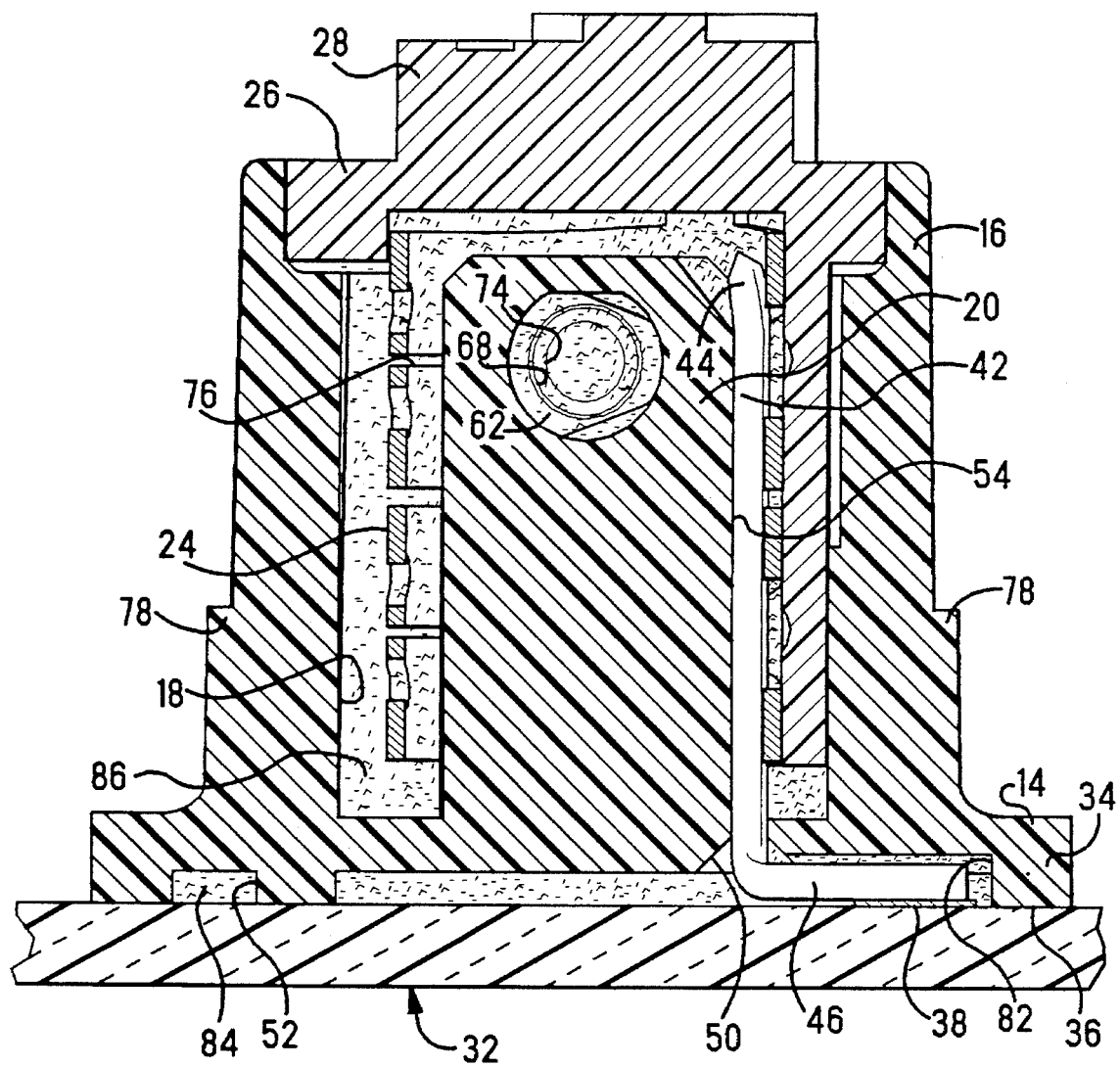
Figure 7:
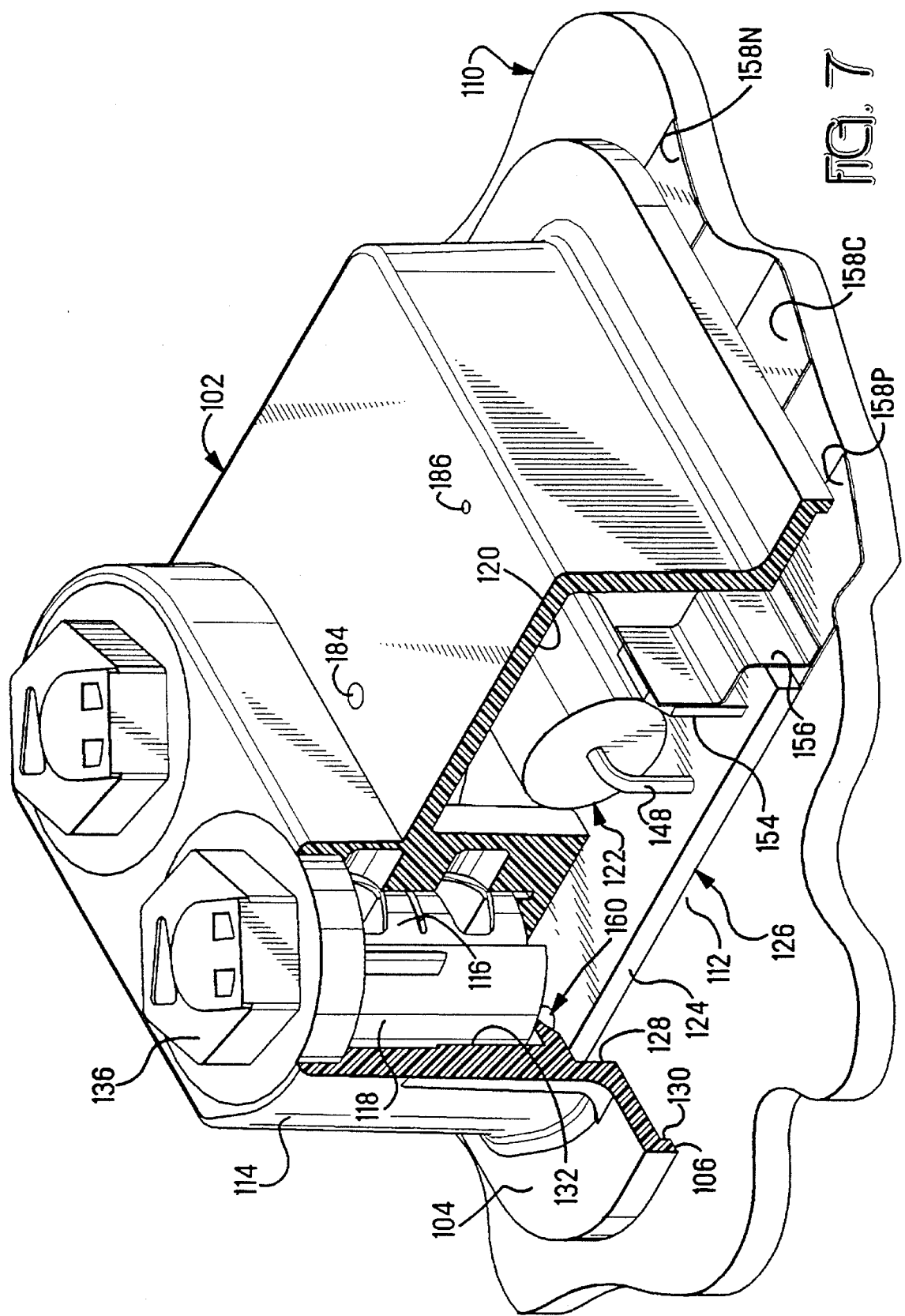
FIG. 7 is an isometric view of another embodiment of the present invention wherein a connector module mounted to a panel includes a pair of housing sections containing terminals and actuators, and a component-bearing circuit card sealed within another housing section, with a portion of the housing broken away.
Figure 8:
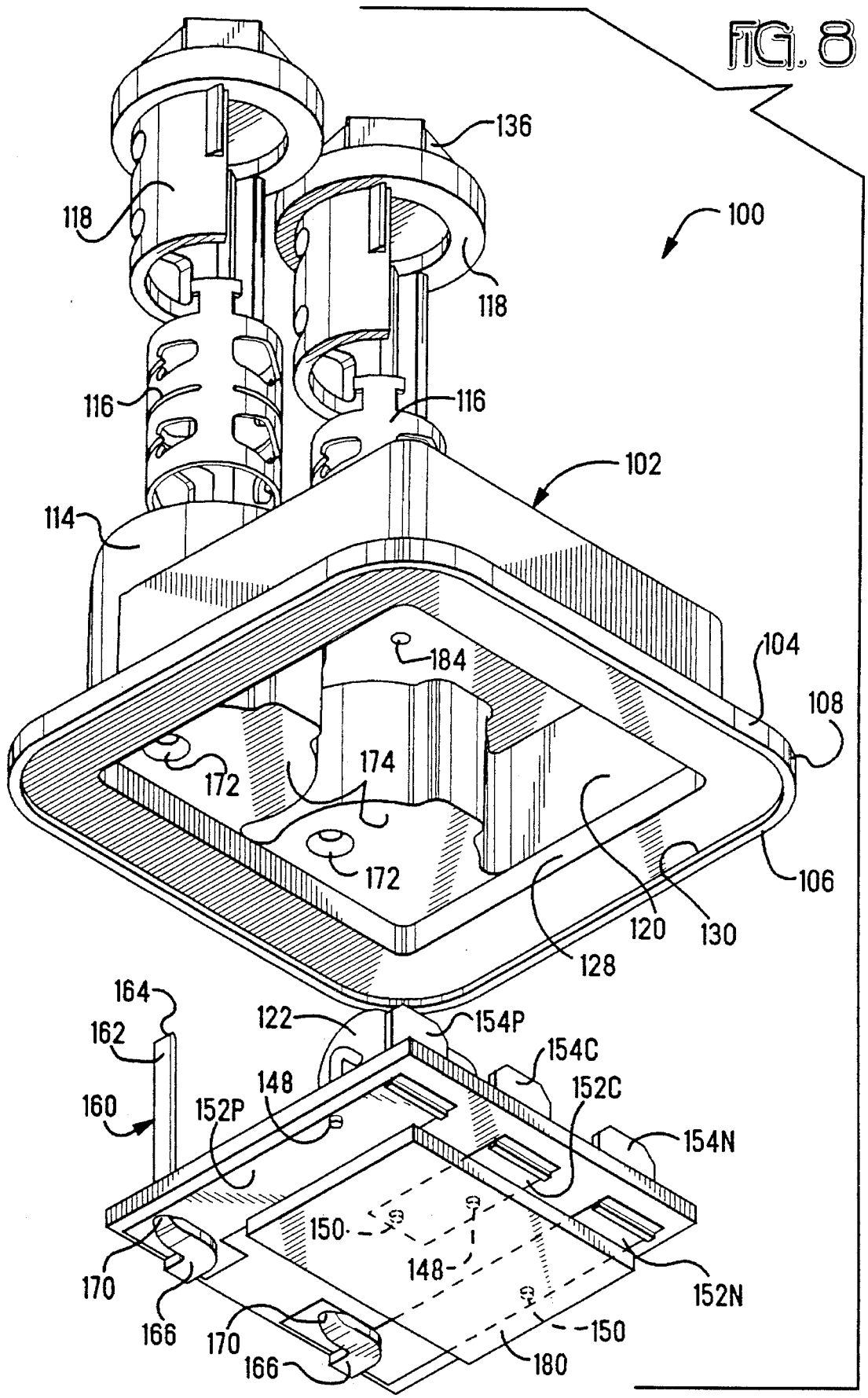
FIGS. 8 and 9 are isometric views of the connector module of FIG. 7 with the housing member, and terminals and actuators exploded from the component-bearing circuit card.
Figure 9:
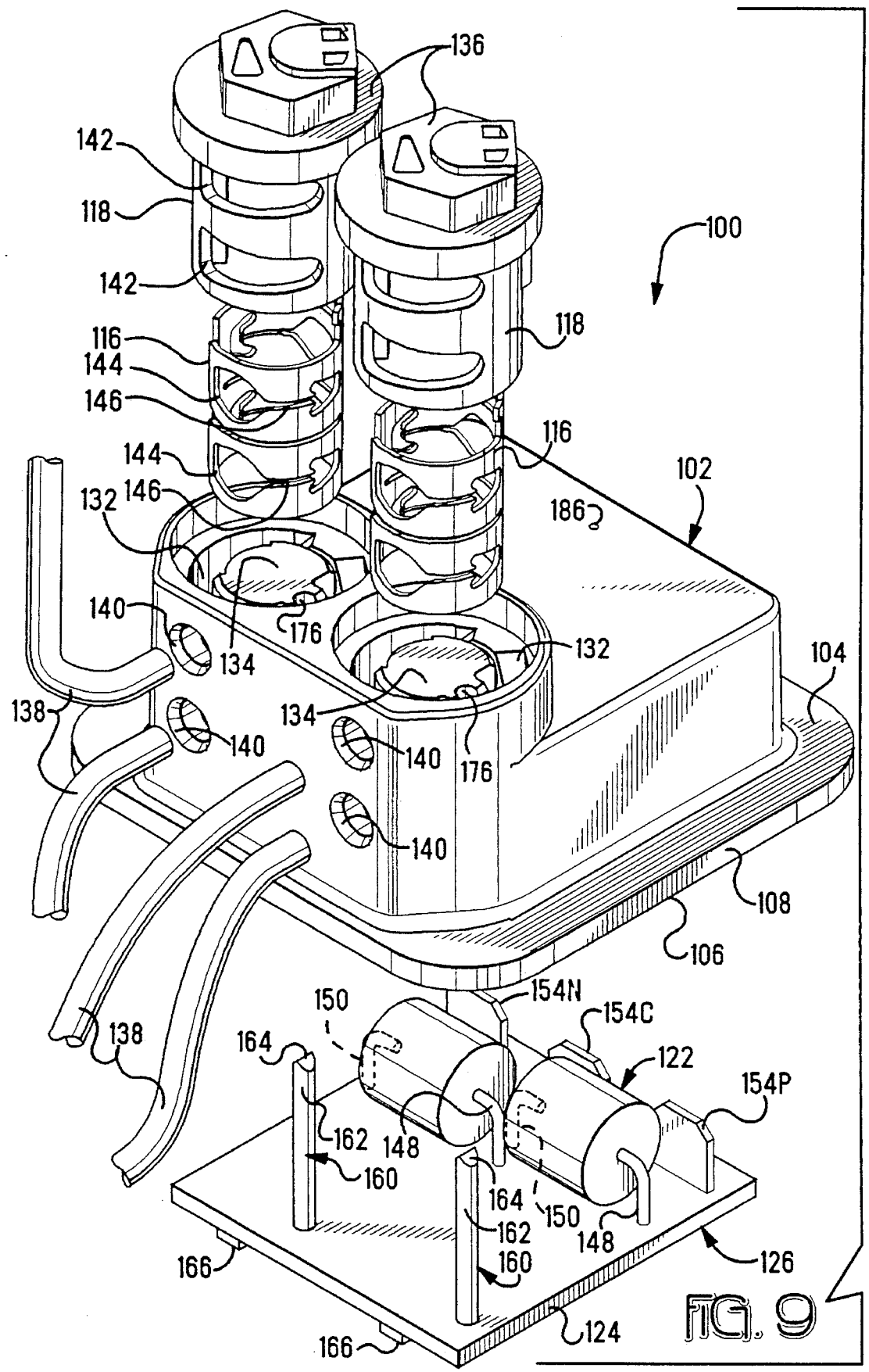
Figure 10:
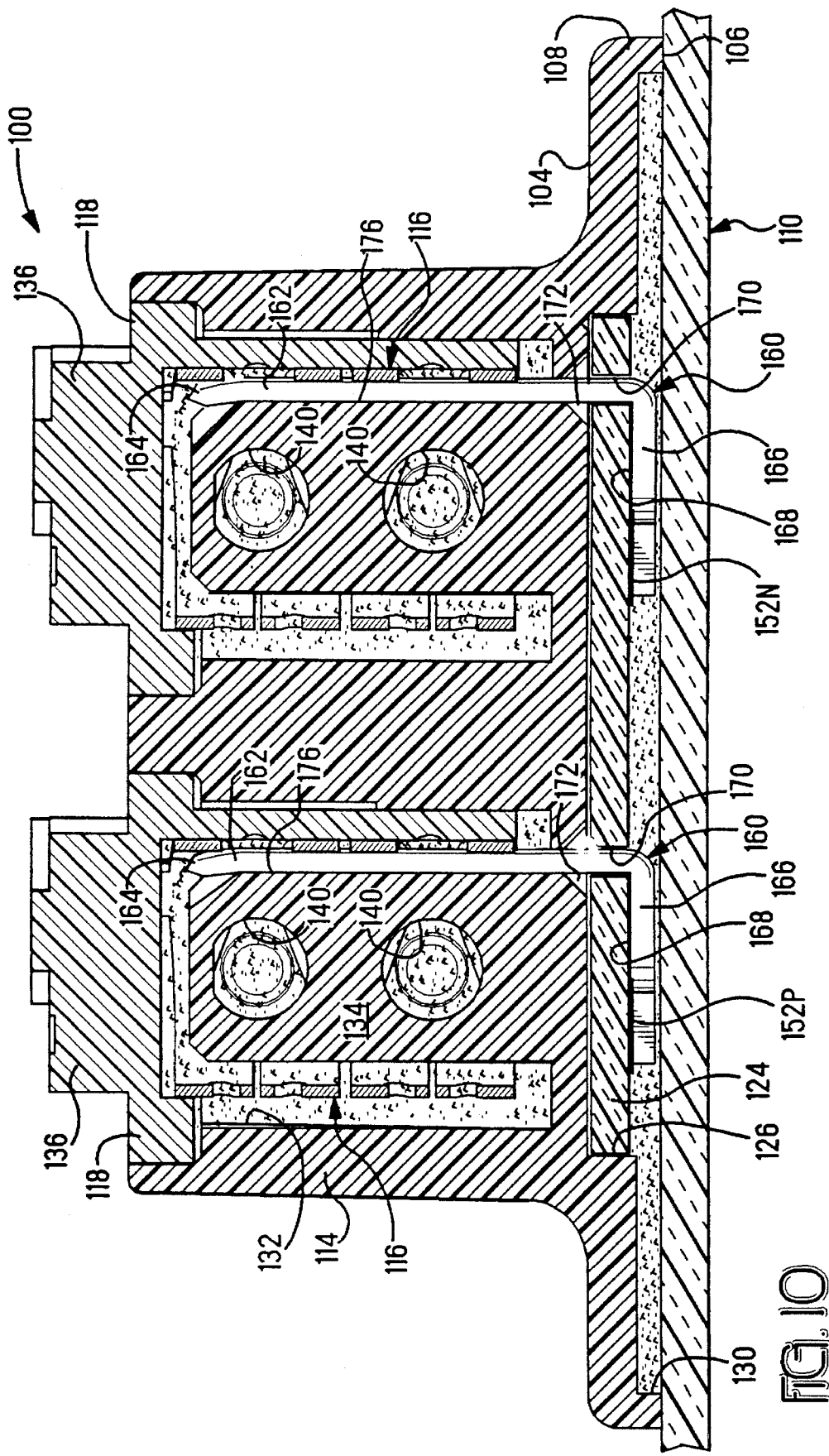
FIG. 10 is a cross-sectional elevational view of the assembled connector module of FIGS. 7 to 9.

Referring now to FIGS. 5 and 6, base section 14 of housing 12 when bonded to frit pad 30 by adhesive material 84 defines an environmental seal surrounding and protecting lead 40 and its terminations to circuit 38 and terminal 24. Housing 12 preferably includes within cavity 18 sealant material 86 which embeds terminal 24 and protects the terminations thereof with lead 40 and with the end of a conductor wire 60 inserted into wire-receiving aperture 62 (seen in FIG. 1). Actuator 26 includes embossments 56 abutting engagement surfaces 58 of terminal 24 and enabling rotation of terminal 24 for wire termination. An end of wire 60 is inserted through wire-receiving aperture 62 of the housing section wall, through an opening 64 in the actuator, through opening 66 of the terminal and at least into aperture 68 of the center post all coaligned.

Upon rotation of terminal 24 by actuator 26, profiled slot 70 extending from the opening of the terminal includes opposed edges that penetrate the wire insulation and electrically engage the conductor of the wire to define an electrical connection therewith. Preferably aperture 68 extends through center post 20, and terminal 24 includes a second wire-receiving hole 72 along the far sidewall thereof that permits the end of a wire 60 to be pushed entirely through center post 20 and into a blind hole 74 in the far sidewall of annular cavity 18. A second slot 76 extending laterally from wire-receiving hole 72 would then similarly penetrate the wire insulation and define an electrical connection with the conductor therein, for redundancy and also permitting the first slot 70 to be utilized for wire strain relief.

After easily mounting connector module 10 to solar panel 32 by placement over upstanding wire section 40 and bonding base section 14 to connector site 30, an electrical connection is thus easily made of wire 60 with terminal 24 of connector module 10, enabling solar panel 32 to be electrically connected to another article such as another solar panel (not shown) to define a bank of solar panels electrically interconnected, all in a manner such that the electrical connections are sealed from harsh environmental influences such as moisture and humidity.

As seen in FIG. 1, housing 12 preferably includes a pair of opposed embossments 78 along otherwise cylindrical housing section 14 having flat outwardly facing surfaces facilitating gripping thereof by pliers or the like during placement of the connector module over the lead, and also during rotation of actuator 26 during wire termination minimizing stress on the bond of module 10 to the solar panel 32 and the solder joint of lead 40 to circuit 38. Also, it is preferred to provide shallow recessed areas 52 along bottom surface 36 of housing 12 enhancing the forming of a bond with the surface of solar panel 32 by placement of adhesive material 84 therein, and also to provide a clearance recess 82 for receipt thereinto of base section 46 of lead 40 thereinto. Optionally, a tape element 88 (shown in phantom in FIG. 1) may be adhered to housing section 16 to traverse wire-receiving opening 62 for assured retention of sealant material 86 within housing section 16 prior to insertion of a wire 60 thereinto and also during withdrawal and replacement of wire 60, as disclosed in U.S. patent application Ser. No. 07/955,535 filed Oct. 1, 1992.

Lead 40 may be formed, for example, by providing a length of tin-plated copper alloy wire and striking an end thereof by appropriate tooling to form base section 46. Adhesive material 84 such as two-part epoxy may be used. Sealant material 86 may be a gel-like fluid as disclosed in European Patent Publication No. 0 529 957 A1 and in Ser. No. 08/166,180 filed Dec. 10, 1993 such as a mixture of an elastomeric thermoplastic polymer such as a composite of diblock and triblock copolymers, and an extender such as a mixture of mineral oil and polyisobutene, and additives such as silica, a crosslinking polymer, corrosion inhibitors and antioxidants.

FIGS. 7 to 10 illustrate another embodiment of the present invention wherein a connector module 100 is adapted for use with a solar panel having blocking diodes to be utilized in its circuitry. Connector module 100 includes a housing member 102 with a base section 104 having a planar bottom edge 106 of continuous peripheral mounting flange 108 for being mounted flush to a planar surface portion of an article such as solar panel 110 at a connector site 112 thereof. Housing member 102 includes a pair of housing sections 114 for respective barrel terminals 116 and actuators 118. A component-receiving housing section 120 is adapted to receive thereinto a pair of blocking diodes 122 mounted to a circuit-bearing element 124 having circuits defined thereon, all defining a component subassembly 126; and housing base section 104 is shaped and dimensioned to receive circuit-bearing element 124 within inner periphery 128 of mounting flange 108. Mounting flange 108 is also seen to have a shallow recess 130 along its bottom surface providing for adhesive material to be disposed therein for mounting to solar panel 110 in a manner sealing around the component subassembly and the electrical connections within connector module 100.

Each housing section 114 has an annular cavity 132 therein about a center post 134, into which is inserted a barrel terminal 116 to surround the center post. Thereafter actuator 118 is inserted into annular cavity 130 surrounding the terminal and having a lug-shaped cap 136 adapted to be rotated by an appropriate tool. Actuator 118 includes embossments engaging terminal 116 and enabling rotation of terminal 116 for wire termination. Ends of one or two wires 138 are inserted through respective apertures 140 of the housing section walls, through openings 142 in the actuator, through openings 144 of the terminal and at least into apertures of the center post all coaligned in a manner similar to that described above with respect to FIG. 5. Upon rotation of terminal 116 by actuator 118, profiled slots 146 extending from the openings 144 of the terminal are defined by opposed edges that penetrate the wire insulation and electrically engage the conductors of both wires to define electrical connections therewith.

Blocking diodes 122 of component subassembly 126 disposed in housing section 120 each include a first electrode lead or cathode 148 and a second electrode lead or anode 150 electrically connected to respective circuits 152 of circuit-bearing element 124 such as by soldering. Tab contacts 154 are mounted to the circuit-bearing element 124 in electrical connection with circuits 152, to be electrically connected to corresponding conductive elements 156 secured to panel 110 at termini of circuits 158 thereof. The circuits of the solar panel comprise a positive bus 158P and a negative bus 158N both connected to respective ends of the plurality of photovoltaic cells of solar panel 110, and a common bus 158C; the circuits of the circuit-bearing element 122 can be said to comprise a positive circuit 152P, a negative circuit 152N and a common 152C; and the tabs interconnecting them are designated 154P, 154N, 154C.

At termini of circuits 152P, 152N are mounted leads or pins 160 having wire sections 162 extending upwardly to free ends 164 from base sections 166 to extend into respective annular cavities 132 of respective housing sections 114, to interconnect respective terminals 116 therein to respective panel circuits 158P, 158N and respective components 122 associated therewith. Base sections 166 of leads 160 are widened and flattened and preferably include flat upper surfaces enabling soldering thereof to termini 168 of circuits 152P, 152N after wire sections 162 are inserted upwardly through apertures 170 of circuit-bearing element 124. Alternatively, base sections 166 may be surface mounted atop circuit-bearing element 124.

Each upstanding wire section 162 extends into a respective aperture 172 through bottom surface 174 of a respective housing section 114 and within and along a groove 176 vertically along center post 134. Free ends 164 of wire sections 162 are preferably tapered to facilitate insertable into respective apertures 172 which also preferably have tapered entrances facilitating insertion, and which are aligned with grooves 176. Upon full insertion along grooves 176, tapered free ends 164 facilitate initial bearing engagement with the bottom edge of a respective terminal 116 upon insertion of terminal 116 thereover and into annular cavity 132 without stubbing. The depth of each groove 176 is selected considering the diameter of wire section 162 so that wire section 162 protrudes laterally partially out of its groove 176 to engage the inside surface of terminal 116 in intimate contact therewith when terminal 116 is inserted into annular cavity 132 upon full assembly. Upon full terminal insertion, terminal 116 is held compressed against wire section 162 of lead 160 and is still rotatable in annular cavity 132 upon rotation of actuator 118.

Circuit-bearing element 124 of connector module 100 is shown to include therebeneath a compressible block 180 such as of foam rubber, permitting incremental movement of circuit-bearing element 124 toward solar panel 110 during placement of housing 102 onto leads 160, defining regions around block 180 even in its compressed state for adhesive material. The bottom surface of block 180 may easily be bonded to the surface of solar panel 110 at connector site 112 prior to soldering conductive members 156 to the respective tab contacts and subsequent placement of housing 102 onto the solar panel. Conductive members 156 preferably are strips of flexible film interconnecting panel circuits 158P, 158N, 158C to tabs 154P, 154N, 154C while permitting flexure after being soldered thereto as housing 102 is placed onto leads 160 and urges circuit-bearing element 122 toward the surface of solar panel 110. The tab contacts may include stop shoulders to facilitate insertion to a particular desired depth into slots 182 of circuit-bearing element 124. Housing 102 is shown to include a fill hole 184 and a vent 186, permitting injection of potting material 188 into fill hole 184 to embed blocking diodes 122 within component-receiving housing section 120 for environmental sealing after connector module 100 has been mounted to solar panel 110.

Figure 11:
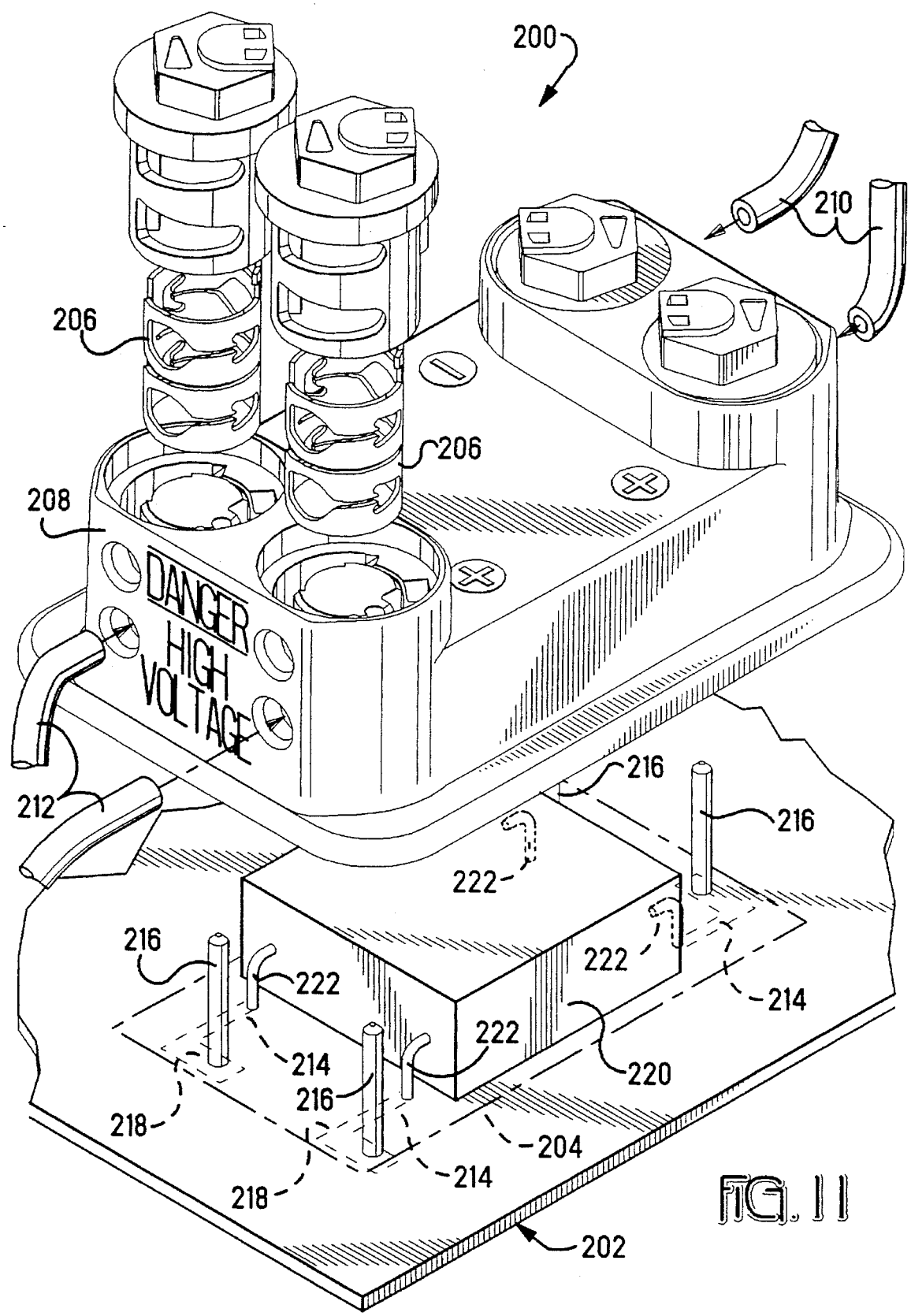
FIG. 11 is an isometric view of a four-terminal embodiment of the present invention affixable to a portion of a circuit board, for interconnection of circuits thereof to four discrete wires.

FIGS. 11 and 12 illustrate an embodiment of the present invention wherein connector module 200 is used with a circuit board 202 at a connector site 204 thereof. Connector module 200 is shown to include four terminals 206 disposed within respective housing sections 208 to provide for the termination of four discrete wires 210, 212 to respective circuits 214 of circuit board 202 at termini thereof. Four leads or pins 216 are mounted to circuit board 202 at termini 218 of circuits 214 to be assuredly electrically connected to respective terminals 206. Component 220 is shown to be a DC-to-DC converter mounted to circuit board 202 by four leads 222 electrically connected to respective circuits 214. Connector module 200 is mounted to connector site 204 similarly to modules 10,100 of FIGS. 1 to 10 and, when potted as described with respect to module 100, defines an environmental seal about the electrical connections of leads 216 to terminals 206 and circuits 214, as well as of leads 222 with circuits 214.

FIG. 12 is a diagrammatic representation of an application of the four-terminal module 200 of FIG. 11, wherein solar panels 110 having modules 100 affixed thereon are electrically connected in series to gather energy by wires 138A, 138B. The energy is then transmitted by wires 210A, 210B to four-terminal module 200 mounted on circuit board 202. DC-to-DC converter 220 is utilized to convert the low voltage/high current input in the form of direct current, to high voltage/low current output. This arrangement isolates the high voltage transmission lines from the array of solar panels, improving safety concerns. Alternatively, it can be seen that the direct current could also if desired be converted to alternating current by an appropriate DC-to-AC converter.

FIG. 11 also illustrates that the connector module of the present invention can be mounted onto a portion of a circuit board to provide an interface with discrete wires, sealed and with facilitated termination thereto. Any component could be sealed within the module, such as a resistor or capacitor, or even a microprocessor to modify or shape a signal transmitted to and through the module from input to output. Such component could be mounted to a circuit-bearing element within the module, with the module subsequently mountable to any appropriate surface. It is easily seen that such a module could contain more than four such terminals enabling connection with more than four discrete wires, such as a barrier strip.

Modifications and variations may occur to the embodiment disclosed herein which are within the spirit of the invention and the scope of the claims. As one example, the lead or pin members could include compliant spring portions, such as is disclosed in U.S. Pat. No. 4,186,982, enabling securing of the lead members in through-holes of a circuit board and defining electrical connections with circuits thereof by engagement with plating material of the through-hole, with or without solder. Further two (or more) wire-receiving holes can be provided for interconnection with each terminal, enabling commoning of wires for input from two sources or for output to two lines. Or the several wire-receiving holes can be varied in dimension to enable interconnection with wires of different diameters within a limited range of sizes.

We claim:

1. A conductor assembly for connecting at least one discrete conductor to a respective circuit of an article and that is mountable to a generally planar mounting surface of the article defining a connection site, comprising:

a housing module having a base section defining a mounting face adapted to be mounted to said surface at said connection site with adhesive sealing material disposed between said mounting surface and said surface surrounding said connection site, said housing module including at least one housing section for a respective terminal, and an at least one said terminal disposed in a terminal-receiving cavity of a respective said housing section and having at least one conductor-terminating section exposed in a respective conductor-receiving opening of said housing section, with fluid sealing material disposed within said terminal-receiving cavity embedding said terminal, and said housing module further including an actuator adapted to move said terminal from a first unterminated position to a second terminated position upon insertion of an end of a said conductor into said conductor-receiving opening of said housing section;

a lead member affixed to said article in a manner defining an electrical connection thereof to each said circuit of said article to which a said discrete conductor is to be interconnected, each said lead member including a pin section extending orthogonally from a surface of said article to a free end; and said mounting face of said housing module including a pin-receiving opening orthogonal to the mounting face and associated with each said lead member adapted to receive thereinto said pin section thereof upon mounting said housing module to said article surface, said pin-receiving opening being in communication with said terminal-receiving cavity of a respective said housing section, said terminal-receiving cavity adapted to urge said pin section of a respective said lead member against a surface of a said terminal upon mounting of said housing module to said connection site and during actuation thereof from said first position to said second position, whereby a sealed connective arrangement is defined upon mounting said housing module to said mounting surface at said connection site.

2. The assembly as set forth in claim 1 wherein said lead member includes a flat, relatively wide base section including a flat surface soldered to a terminus of a circuit.

3. The assembly as set forth in claim 2 wherein said flat surface of said lead member is a bottom of said base section, and said lead member is mounted atop a surface containing said circuit.

4. The assembly as set forth in claim 1 wherein said article is a planar circuit-bearing element and said housing module includes a cavity adapted to receive thereinto said planar circuit-bearing element along said mounting face.

5. The assembly as set forth in claim 4 wherein said planar circuit-bearing element includes electrical or electronic components mounted thereon and electrically connected to at least two said circuits thereof defining a component subassembly, and said cavity is adapted to receive thereinto said component subassembly.

6. The assembly as set forth in claim 5 wherein said housing module includes a fill hole and a corresponding vent hole enabling injection of potting material into said cavity to embed an inwardly facing surface of said component subassembly and seal the electrical connections contained therein.

7. The assembly as set forth in claim 1 wherein said housing module base section includes a mounting flange peripherally therearound including peripheral wall sections extending to a coplanar edge abuttable with said mounting surface and defining a shallow recess therewithin to contain adhesive material for adhering said housing module to said mounting surface.

8. The assembly as set forth in claim 1 wherein said housing module base section includes a shallow recess adjacent each said pin-receiving opening therethrough for receipt thereinto of a base section of a respective said lead during placement of said housing module onto said connection site.

9. A connective arrangement for connecting at least two discrete conductors to respective circuits of an article and that is mountable to a generally planar mounting surface of the article defining a connection site, comprising:

an article containing at least two circuits and including an electrical or electronic component secured thereto in electrical connection with at least two said circuits;

a housing module having a base section defining a mounting face adapted to be mounted to said surface at said connection site with adhesive sealing material disposed between said mounting surface and said surface surrounding said connection site, said housing module including at least one housing section for a respective terminal, an at least one said terminal disposed in a terminal-receiving cavity of a respective said housing section and having at least one conductor-terminating section exposed in a respective conductor-receiving opening of said housing section, with fluid sealing material disposed within said terminal-receiving cavity embedding said terminal, and said housing module further including an actuator adapted to move said terminal from a first unterminated position to a second terminated position upon insertion of an end of a respective said conductor into said conductor-receiving opening of said housing section;

a lead member affixed to said article in a manner defining an electrical connection thereof to each said at least one circuit of said article, said lead member including a pin section extending orthogonally from a surface of said article to a free end; and said mounting face of said housing module including a pin-receiving opening orthogonal to the mounting face and associated with each said lead member adapted to receive thereinto said pin section thereof upon mounting said housing module to said article surface, said pin-receiving opening being in communication with said terminal-receiving cavity of a respective said housing section, said terminal-receiving cavity adapted to urge said pin section of a respective said lead member against a surface of a said terminal upon mounting of said housing module to said connection site and during actuation thereof from said first position to said second position; and said housing module includes in communication with said mounting face a cavity adapted to receive thereinto an at least one electrical or electronic component mounted onto said article and electrically connected to at least two said circuits thereof, whereby a sealed connective arrangement is defined upon mounting said housing module to said mounting surface at said connection site.

10. The connective arrangement as set forth in claim 9 wherein said lead member includes a flat, relatively wide base section including a flat surface soldered to a terminus of a circuit.

11. The connective arrangement as set forth in claim 10 wherein said flat surface of said lead member is a bottom of said base section, and said lead member is mounted atop a surface containing said circuit.

12. The connective arrangement as set forth in claim 9 wherein said article is a planar circuit-bearing element containing said at least one electrical or electronic component defining a component subassembly, and said housing module includes a cavity adapted to receive thereinto said component subassembly along said mounting face.

13. The connective arrangement as set forth in claim 12 wherein said circuit-bearing element includes contact members exposed to permit electrical connections of said at least two circuits thereof with corresponding circuits defined on said mounting surface.

14. The connective arrangement as set forth in claim 13 wherein said housing module is adapted to receive said component subassembly into said cavity while simultaneously receiving said pin sections of said lead members into respective said pin-receiving holes, enabling said contact members to be electrically connected to said corresponding circuits of said mounting surface prior to said housing module being placed over said component subassembly and adhered to said mounting surface and sealing around said component subassembly and exposed electrical connections thereof.

15. The connective arrangement as set forth in claim 9 wherein said housing module includes a fill hole and a corresponding vent hole enabling injection of potting material into said cavity to embed an inwardly facing surface of said component subassembly and seal the electrical connections contained therein.

16. The connective arrangement as set forth in claim 9 wherein said housing module base section includes a mounting flange peripherally therearound including peripheral wall sections extending to a coplanar edge abuttable with said mounting surface and defining a shallow recess therewithin to contain adhesive material for adhering said housing module to said mounting surface.

17. The connective arrangement as set forth in claim 9 wherein said connection site is defined on said article surface surrounding termini of said at least two circuits thereof.

18. The connective arrangement as set forth in claim 9 wherein said article is a planar circuit-bearing element defining said mounting surface.

\* \* \* \* \*